Figure 1A:
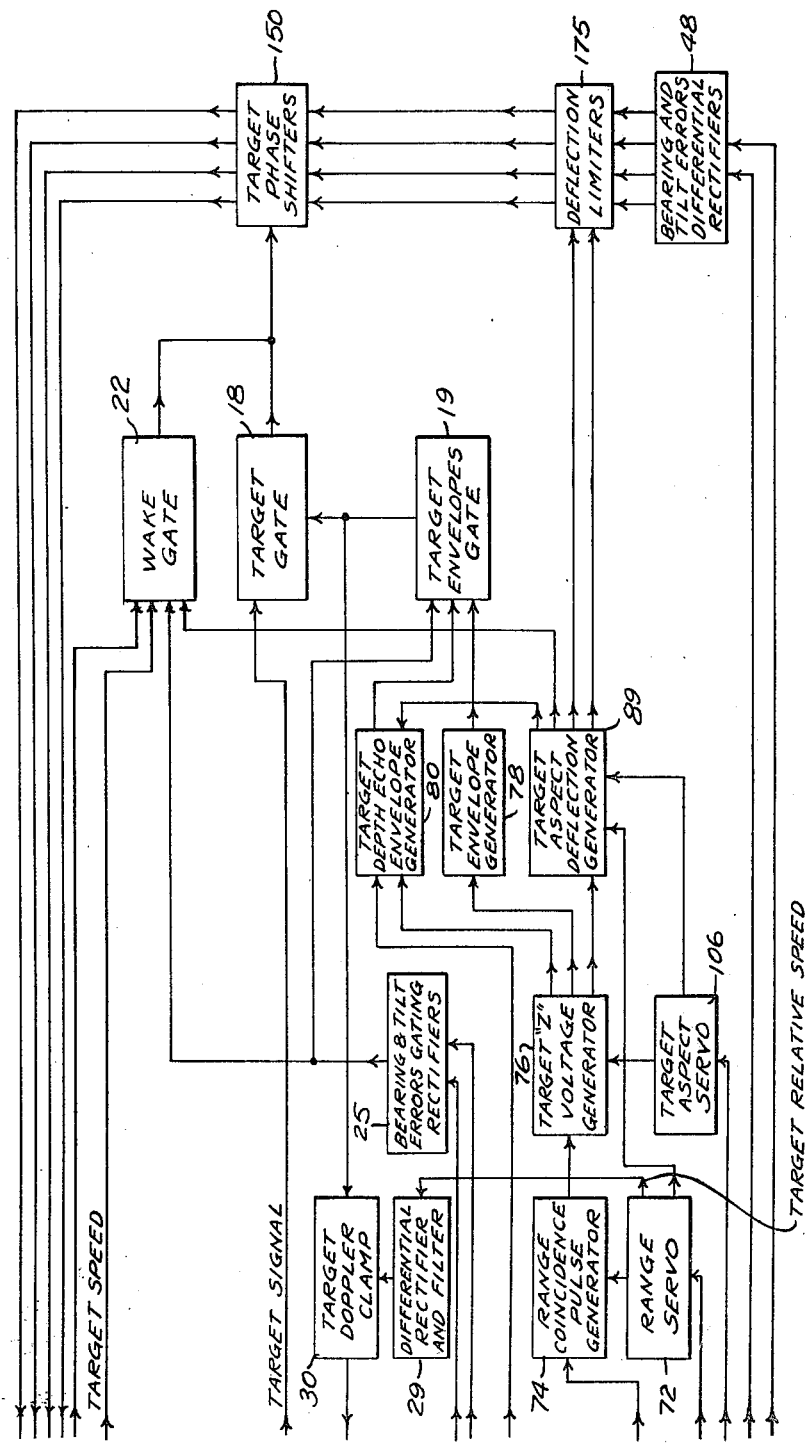

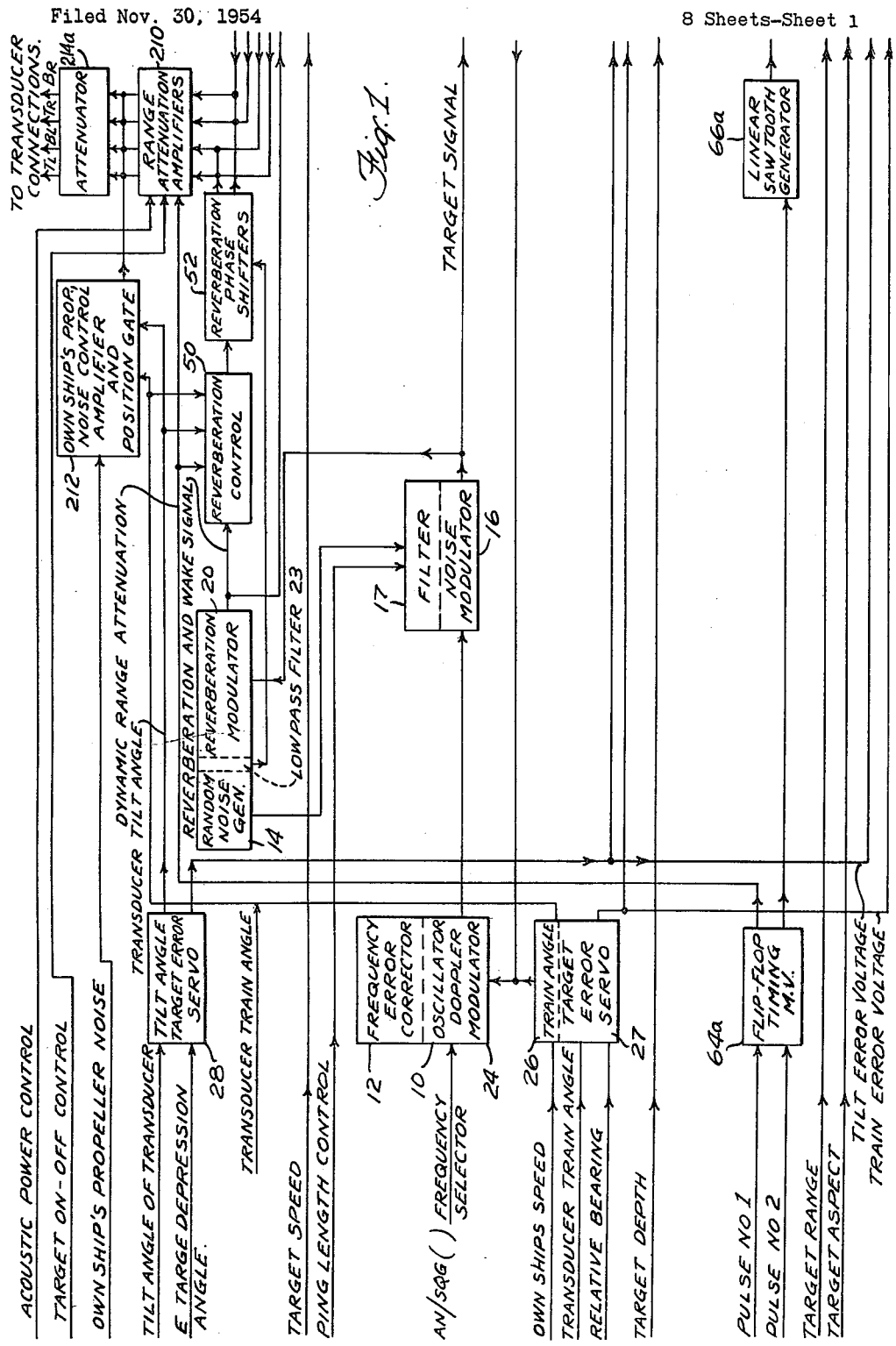

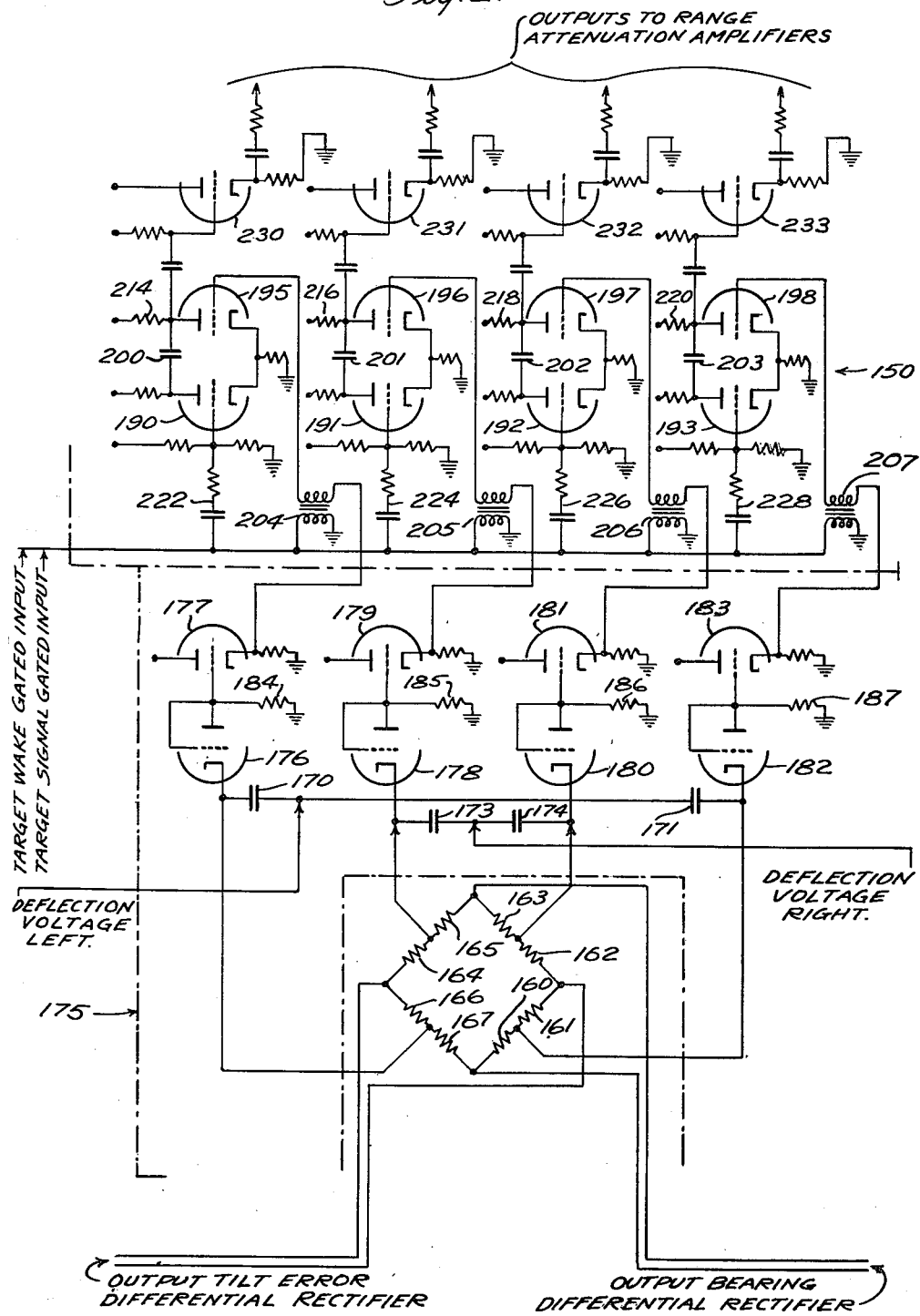

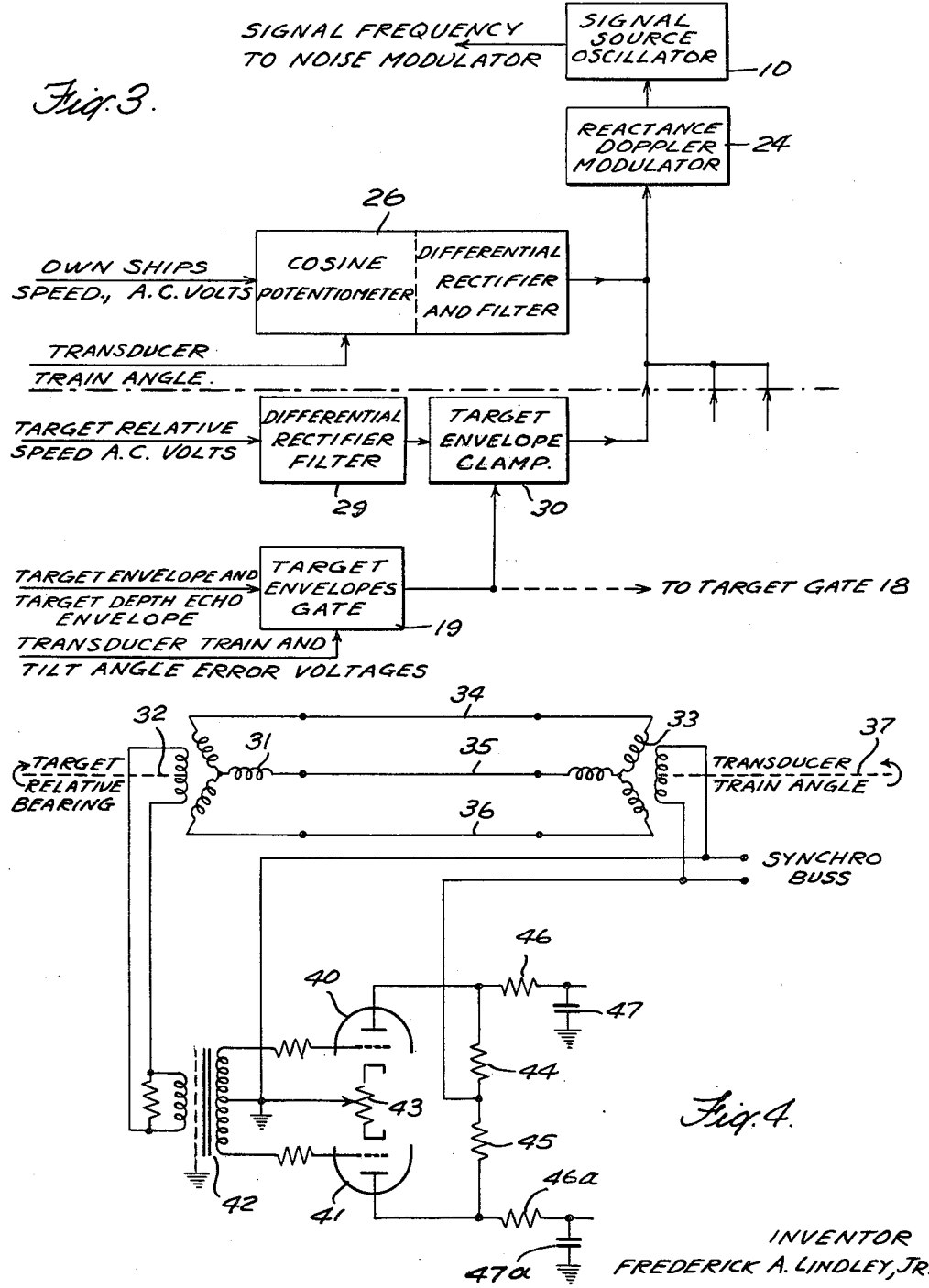

Nov. 14, 1961     F. A. LINDLEY, JR     3,008,244
SONAR SIMULATOR
Filed Nov. 30, 1954     8 Sheets-Sheet 5
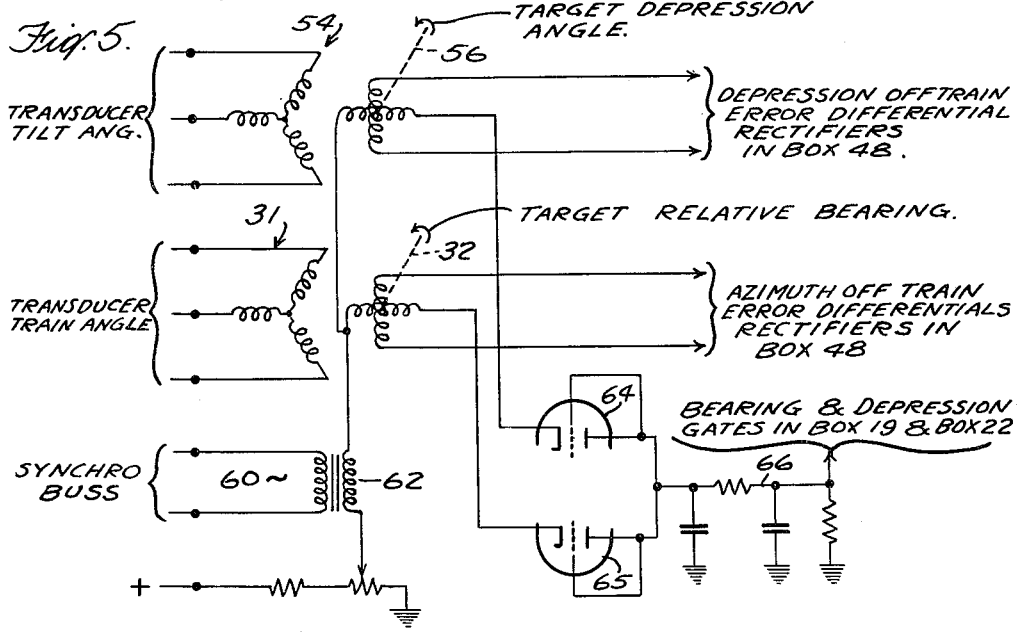
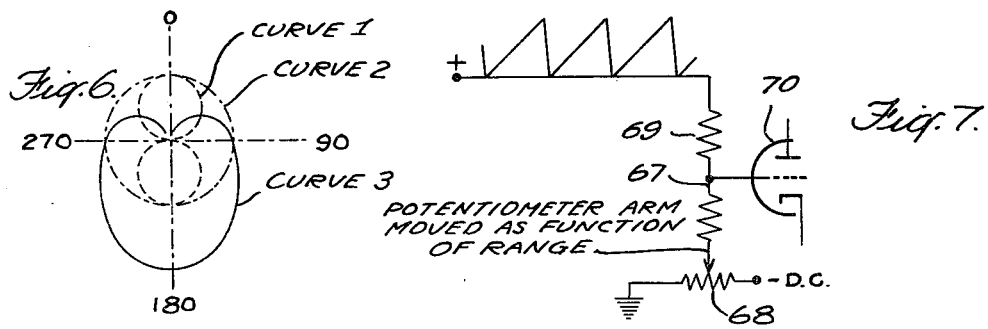
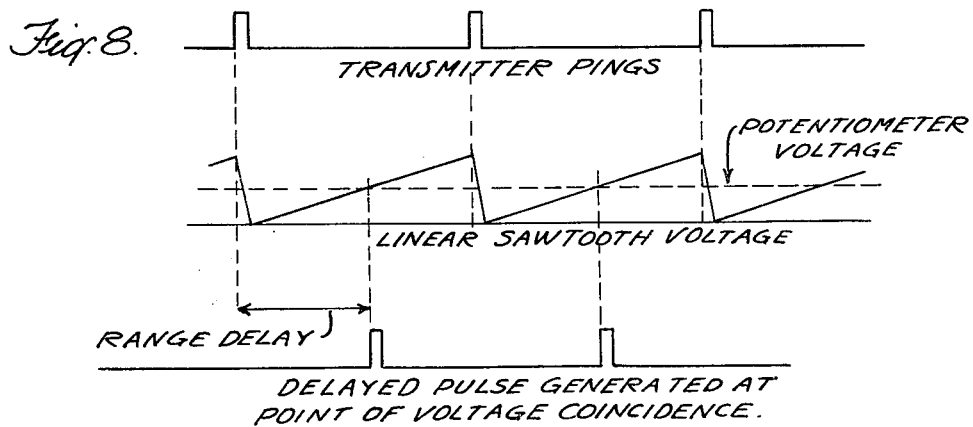

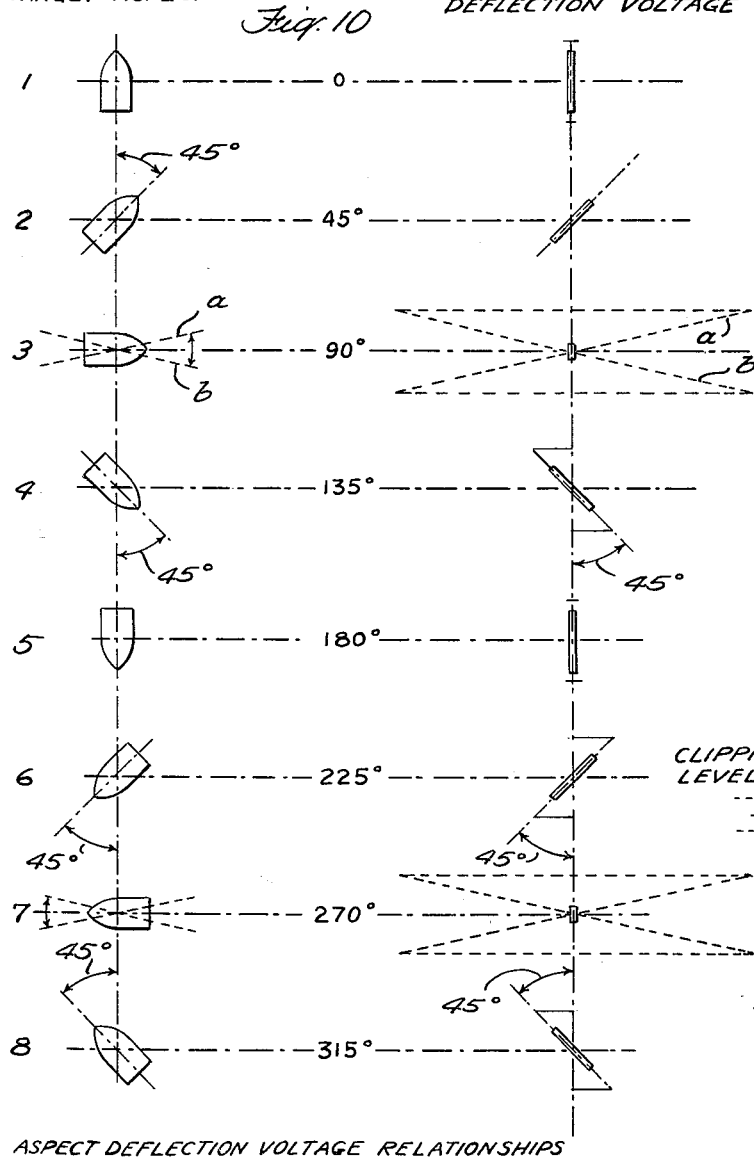

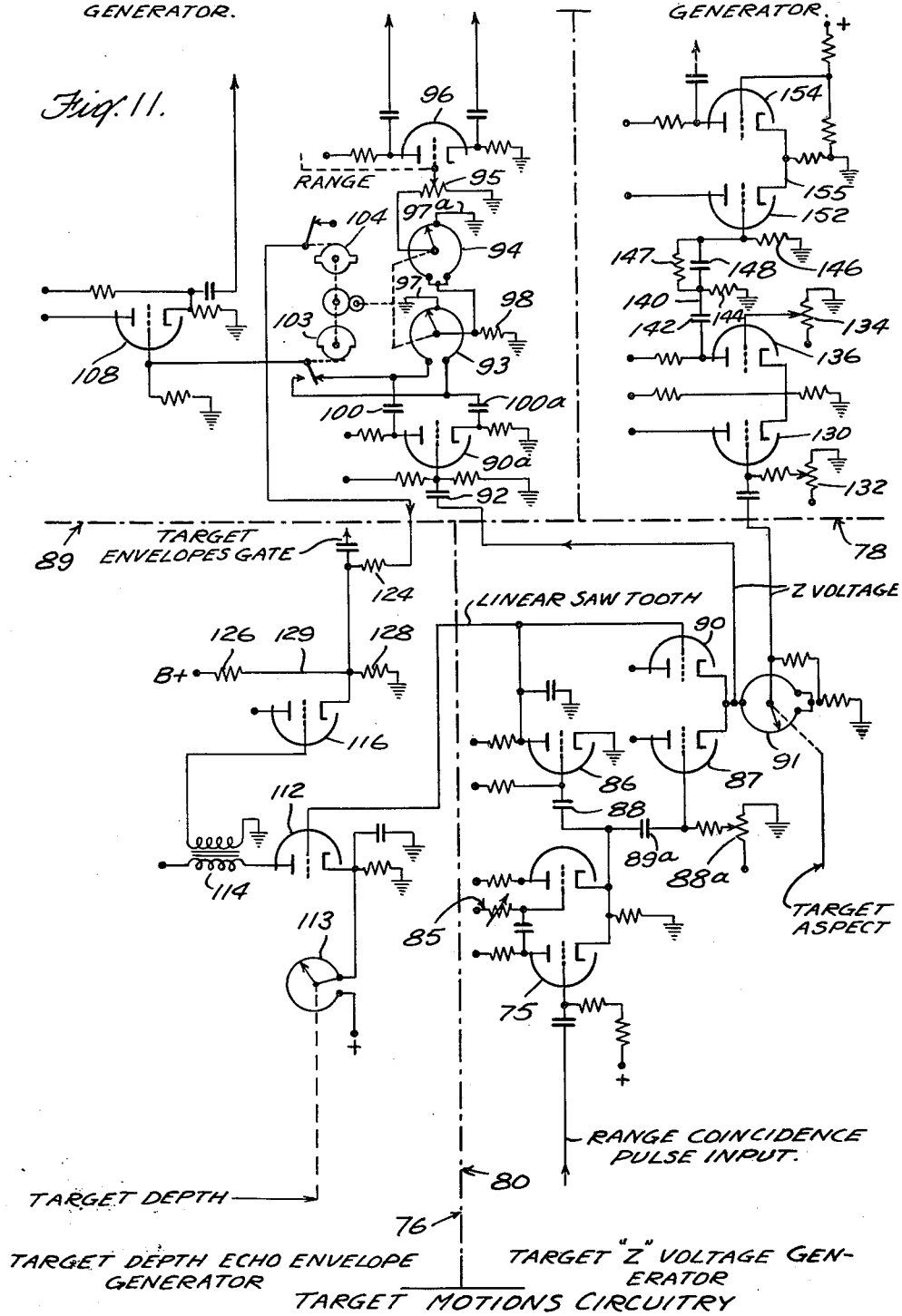

Nov. 14, 1961   F. A. LINDLEY, JR   3,008,244
SONAR SIMULATOR
Filed Nov. 30, 1954   8 Sheets-Sheet 8

ASPECT CONTROL

TANGENT POTENTIOMETER CHARACTERISTIC

INVENTOR
FREDERICK A. LINDLEY, JR
BY
ATTORNEY

United States Patent Office 3,008,244
Patented Nov. 14, 1961

3,008,244
SONAR SIMULATOR
Frederick A. Lindley, Jr., Flushing, N.Y., assignor to Smith-Meeker Engineering Company, New York, N.Y., a corporation of New York
Filed Nov. 30, 1954, Ser. No. 471,987
10 Claims. (Cl. 35—10.4)

This invention relates to a sonar trainer and particularly a device for generating and controlling simulated signals to accord with the aural and visual characteristics of echo and transmitted signals associated with standard sonar gear.

The invention embodies a signal simulating device which is adaptable to various types of sonar gear. This is due to the fact that no effort is made to simulate the gear itself but only the characteristics which are thought to have prominence in every returning signal. Nor is the simulator limited to any specified number of assumed targets, or the simulation of any particular characteristics deemed from present studies to be most significant in the composition of sonar echoes. The signal modulating voltages are synthesized in separate, unitized circuits which results in a highly flexible design and the possibility of removing or replacing control units depending on the degree and kind of realism it is desired to achieve.

Generally there are two fairly distinct aspects of sonar simulation, one being the generation of the basic signals, such as reverberation, target and wake, and the other control of the signals in accordance with target motion and relative position. Most of the circuit features are readily adaptable to various types of sonar gear and have additional advantages which will become apparent on reading the detailed description.

In the target motion section of the simulator applicant has so arranged the units that the various control voltages are derived from a common multivibrator pulse producer. Hence the simulated generation of the target envelope, target wake envelope, a delayed pulse for target depth echo and a control voltage, which imparts aspect position characteristics to the target and wake signals, originates at a single source. This insures stability and a consistency in operation and makes for simplicity in construction and maintenance.

Furthermore, unique circuitry is presented for phase shifting the output in the four channels which carry the target, wake and other echo signals to the four transducer quadrants in the operational gear section. A plus or minus 90° shift is realized without the necessity of ganging the shifter units or unrealistically modulating signal amplitude. Also the circuitry for limiting the frequency shift to 90° has been especially designed for the simulator and is an improvement over deflection limiters in use.

In recognition of the fact that changes in the aural and visual appearance of the signals occur with changes in ping length, the invention provides means for impressing on the signals random frequencies which are controlled by the operational gear as a function of ping length. A more realistic presentation of the reverberation, wake and target signals is accordingly effected.

A unique system is provided for controlling shift in frequency to simulate doppler effect as produced by own ships movement and for applying the target doppler voltage for moving targets to the target oscillator as a function of target pulse and transducer train angle all of which represents an advance over present systems.

Figure 12:
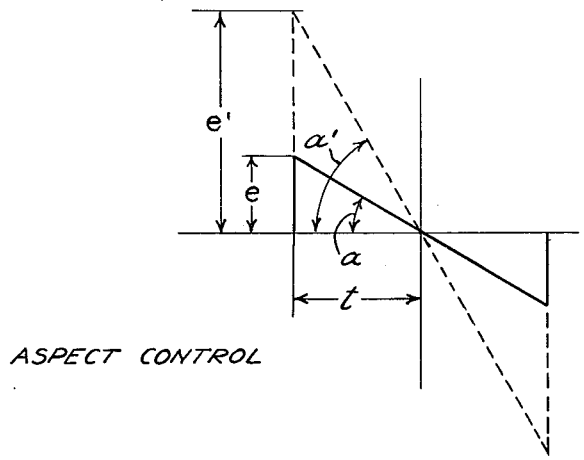
Figure 13:
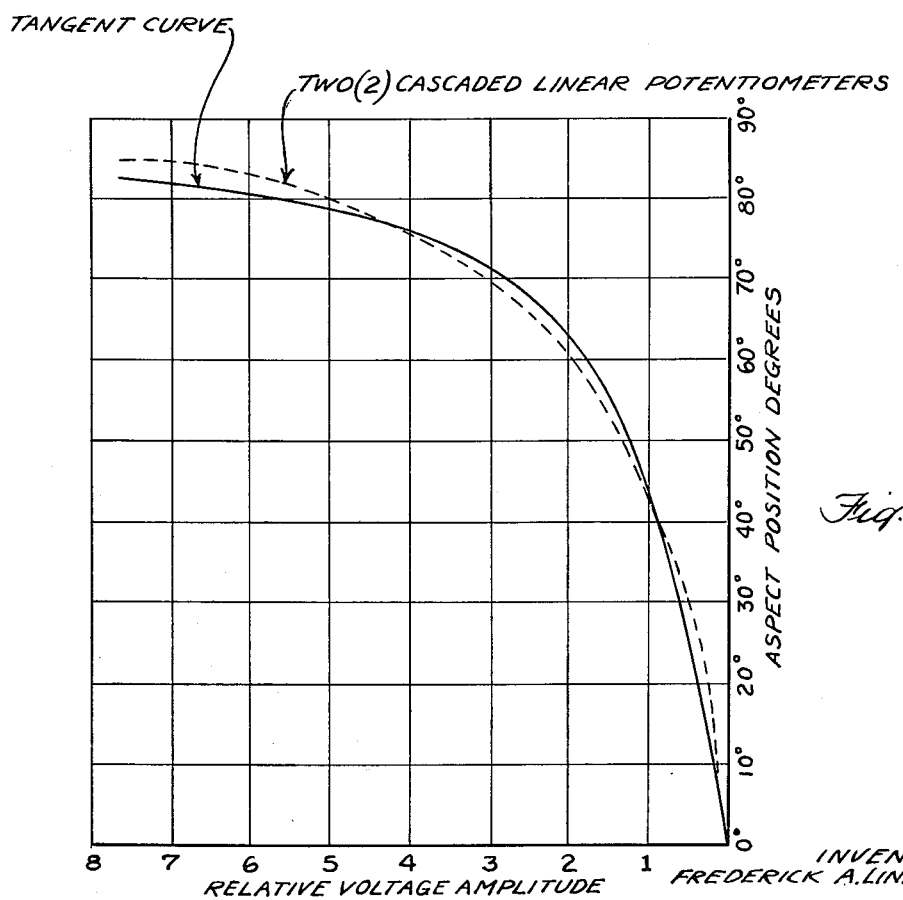

These and other novel features with respect to the arrangement of the simulator units and circuitry will be appreciated on reading the detailed description which follows, in which FIG. 1 is a partial block diagram of the sonar simulator;
FIG. 1A is a block diagram showing an individual target section. FIGS 1 and 1A comprise a complete single target simulator;
FIG. 2 shows the circuitry for phase positioning and limiting;
FIG. 3 is a block diagram showing a unique system for producing own ship and target doppler effect;
FIG. 4 shows circuitry for bearing error positioning;
FIG. 5 shows circuitry for bearing and depression angle gate control;
FIG. 6 shows a typical voltage pattern for a CT rotor, a transformer in series therewith and a combination pattern as the rotor is rotated through 360°;
FIG. 7 is a circuit scheme for producing a linear time delay as a function of range in triggering a multivibrator;
FIG. 8 shows the time relation of the transmitter pings and the delayed pulses;
FIG. 9a shows the evolution of wave forms in the production of the target envelope wave form;
FIG. 9b shows the effect of clipper input amplitude on the duration of the target envelope pulse;
FIG. 10 shows the relationship of target aspect and the simulated target aspect deflection voltage;
FIG. 11 shows the circuitry for producing signal controls to simulate target and wake position characteristics;
FIG. 12 shows a Z voltage wave form and the relation of target aspect angle to its tangent; and
FIG. 13 is a graph of the tandem potentiometer output as compared with the tangent function.

The echo signals which are returned to a sonar receiver from targets in motion and their resulting wakes and from other objects situated in a random fashion throughout the sea volume are all basically related. That is, their fundamental wave form component is basically the frequency of the transmitted sound pulse. The device therefore employs a single oscillator 10 for the artificial generation of these signals. Hence there is no problem of maintaining separate oscillators at the same basic frequency which is frequently a source of trouble in other sonar trainers in view of the fact that the ear can distinguish differences and changes of only a few cycles. If it is desired to correct the oscillator frequency to the frequency of the sonar transmitter during transmitting intervals, a frequency error corrector 12 may be provided as illustrated generally in FIG. 1. A system for stabilizing frequencies is disclosed in my Patents Nos. 2,688,730 and 2,528,632 and could be appropriately adapted to the present sonar simulator.

It is recognized that target, wake and reverberation echoes resulting from short transmitter ping lengths give rise to a less distinct tonal characteristic than echoes from longer transmitter pings. The shorter the transmitter ping length the more intense the random phase and amplitude variations of the echoes appear to be and conversely the longer the transmitter ping length the less intense the random phase and amplitude variations of the echoes appear to be. In order to realistically impart this condition to the simulated echo signals, a wide band random noise generator 14 is provided which is connected to a noise modulator 16 through a filter 17 which is adapted to select a wide frequency band in the vicinity of the oscillator or transmitter frequency. To the noise modulator 16 is also connected the oscillator 10. The amplitude of the random noise fed to the noise modulator 16 is controlled from the operating gear section as a function of ping length. The noise modulator 16 output is fed to a target envelope gate 18 and a reverberation envelope modulator 20 which in turn furnishes reverberation signals and also wake signals to a wake gate 22. The modulator 20 has a low pass RC filter 23 which selects only a very low band of random noise frequencies thus imparting common random envelope characteristics to the wake and reverberation signals. The noise modulator 16 furnishes the fundamental wave components for target, wake, and reverberation and consequently by varying the degree of noise modulation the change in tonal effect may be imparted to all types of echo signals as though there had been a change in transmitter ping length. This method of varying the tonal effect and visual appearance of the echo signals is consistent with the theory that the degree of random modulation largely determines their character. This has been found to be especially true where the transmitter pings lengths are short. The ping length attenuator control connection to the noise modulator 16 as shown in FIG. 1 enables the operator to control the change in signal effect with change in ping length.

The three signal outputs target signal, wake and reverberation can be branched out for the addition of as many echo signals as desired. Thus if three targets are desired the signal output from the noise modulator 16 is fed to three target envelope modulators. The generation and control of the three individual target envelopes is accomplished in accordance with the three individual target motions, and when fed to their respective target envelope modulator, keys or gates on a corresponding echo signal.

If it is desired that these three signals have wakes, the signal output for wake from the reverberation envelope modulator 20 is likewise branched to feed three wake envelope modulators. The individual wake envelopes are generated and controlled in conjunction with their respective target motions and, when fed to their respective wake envelope modulator, keys or gates on a wake signal related to its target.

As shown in FIG. 3 the signal source oscillator 10 is connected to a reactance doppler modulator 24 and the voltage supplied to the reactance modulator shifts the frequency of the oscillator for the purpose of simulating doppler effects. A positive voltage would for example shift the frequency higher and a negative voltage shift it lower.

Since sonar gear observes doppler effects in stationary objects due to own ships speed, the simulator provides for own ships doppler by supplying a proper control voltage to the doppler modulator 24. An A.C. voltage proportional to speed is provided. Reverse speed would be represented by reversing the phase or polarity. The amount of doppler depends also on the angle of train of the transducer with respect to the stationary target. A cosine potentiometer in box 26 excited by the A.C. voltage and operated by the train angle of the transducer furnishes the cosine component. The cosine potentiometer also is arranged to reverse the phase or polarity when the train angle is pointed aft to correspond with the actual reversal of own ships doppler when swinging the transducer training from forward to aft and vice-versa.

This cosine component is then rectified by a differential rectifier in box 26. The differential rectifier is capable of giving either a positive or negative D.C. voltage output depending on the A.C. phase or polarity corresponding to the forward or reverse speed. This is followed by a filter, also in box 26, to give a smooth D.C. output. A high value of resistance is placed in series with this output. The resulting D.C. voltage is continuously applied and controls the reactance modulator for own ship's doppler.

Each target relative speed voltage, on the same calibration basis as own ship's speed, is fed to its individual differential rectifier and filter in box 29. This differential rectifier and filter is exactly similar to the one just described for own ship's speed. The resultant plus or minus D.C. output feeds the target doppler clamp in box 30. This acts as a switch between the target relative speed control voltage and the reactance modulator input. It normally keeps the target speed voltage disconnected from the reactance modulator input line and thus own ship's speed voltage is in control of the reactance modulator. However, when a target envelope and a target depth echo envelope pulse is applied to the target gate in box 18 it switches for the duration of the pulse the target speed voltage to the doppler reactance modulator input line. Impedances are arranged so that the target relative speed voltage sets the line voltage when it is clamped to it. The impedance of the target relative speed voltage source is considerably lower than the impedance of the own ships speed voltage source. The action is to momentarily shift the signal oscillator frequency to correspond to the target doppler. Target envelopes gate in box 19, connects the target envelope generators to the target gate in box 18 and the target envelope clamp in box 30. It is controlled by the train and tilt angle of the transducer. The envelope pulses, which are passed by the largest envelopes gate in box 19, gate on the target signal in box 18 and also the target relative speed voltage in the target envelope clamp permitting it to be applied to the doppler modulator 24. Thus in the same time interval the target doppler effect is applied to the signal along with the gating of the target signal to the transducer channels.

The provision for preventing passage of the target and wake signals to the transducer channels and the target Doppler voltage to the reactance modulator except when the transducer is trained nearly on the target is illustrated in FIG. 5. The gating must be maintained closed when the transducer is off-train in either tilt or train angle or both. As shown in FIG. 1A the target gate 18, wake gate 22 and target Doppler clamp 30 are supplied by rectifiers in box 25 with a bearing and tilt off-train error control voltage. This error control voltage is derived from the bearing and depression angle gate control circuit of FIG. 5. Two CT synchros 54 and 31 (FIG. 5) are excited by a transducer tilt angle synchro generator (not shown) and a transducer train angle synchro generator 33 (FIG. 4) which have their rotors 56 and 32 respectively, turned as a function of assumed target depression angle and target relative bearing respectively. The azimuth angle servo system is located in box 27 while the depression angle servo system is located in box 28.

One winding of each rotor is connected to the depression and azimuth off-train error differential rectifiers in box 48. The other winding of each rotor, which is oriented 90° from its associated winding on the rotor, is connected each to a separate cathode of dual rectifier tubes 64 and 65 in box 25 and to furnish subsequently the on-off gate control bias. The same winding which supplies the differential rectifiers could also supply the on-off gate dual rectifiers 64 and 65 but since the winding has two nulls 180° apart, the target would be improperly gated on in an additional 180° position. It is therefore to remove this ambiguous null that the circuit of this second 90° winding is employed. In the interest of clarity, the rotor windings for the gating rectifiers 64 and 65 are not shown in FIG. 4.

A 60 cycle transformer 62 supplies from the synchro buss an A.C. voltage just equal to the maximum rotor voltage and has its phase carefully adjusted for a 0° or 180° relationship to the rotor voltage depending upon the selected null position. The synchros are uniform enough in manufacture so that this one transformer can supply not only both CT synchros but those for all other targets as well. This A.C. voltage is introduced in series with the rotor windings. At the other end of the rotor windings the resultant addition of this voltage and the rotor voltage is taken out.

The normal CT rotor voltage describes a figure of eight pattern when revolved through 360°. It shows two nulls of voltage 180° apart and the phase of the two loops of voltage differ by 180°. Curve 1 shown in FIG. 6 illustrates this voltage pattern. The transformer, since it supplies a constant A.C. voltage regardless of CT rotation, can be represented by a circle, curve 2, its radius being equal to the maximum of the figure of eight pattern. Combining these two voltages by addition results in the cardioid pattern shown by curve 3. This cardioid pattern has only one null which occurs when the out of phase maximum figure of eight voltage just balances out the steady A.C. voltage of the transformer. For all other rotational positions a resultant voltage occurs. It will now be noted that this cardioid null is 90° removed from the figure of eight nulls and therefore would be coincident with one of the two 180° nulls of the first rotor winding. By this means the ambiguity of the two rotor nulls is removed.

The combined rotor output is passed to the cathodes of the dual rectifier tubes 64 and 65 for each of the two CT synchros respectively. The two plates of the rectifiers are joined and feed a common filter 66. The output of filter 66 is fed to the target envelopes gate in box 19 for controlling the target envelope clamp in box 30 and the target gate in box 18 and the target wake gate in box 22. The result is that if the transducer is off-train in either tilt angle or train angle or both a rectified negative voltage is produced in the filter. Therefore, in order for the gates to be opened by removing the negative voltage, proper training on the target for both bearing and depression angle must occur.

There is an important additional characteristic not yet considered. Where an AN/SQG–( ) transducer system is employed, the echo signals feed into four elements of the transducer which receive the signals in slightly different phase relation unless they come from a point source or the transducer is directed squarely at the object in both train and tilt angle. If now we train slightly off, say in azimuth, the phase of the signal should advance equally for example in the two left transducer channels and correspondingly retard in the two right transducer channels. Differential bias or position voltages applied to the respective transducer channel phase shifters accomplishes the simulated phase modulation.

The differential or position error voltage is obtained by comparing synchro information differentially as explained with reference to FIG. 5. The outputs from the first rotor windings of the two CT synchros 54 and 31 as described are fed respectively to the depression angle error off-train differential rectifier and the azimuth error off-train differential rectifier. The outputs of the differential rectifiers represent positioning control for top, bottom and left, right. By combining these voltages in a resistor network appropriate control functions for the four transducer channels top left, bottom left, top right and bottom right are obtained. Four phase shifters in box 150 are employed to modulate each of the inputs respectively in the four channels TL, BL, TR, and BR to the transducer. Since each target with its associated wake is a separate control function this circuitry is repeated for each target as can be seen by reference to FIG. 1A.

FIG. 4 illustrates the basic bearing error positioning simulation means employed in the simulator. CT synchro 31 has a rotor shaft 32 the position of which represents the target's relative bearing. Its three-phase stator is connected to a three-phase stator of synchro generator 33 by leads 34, 35 and 36. Rotor shaft 37 of synchro generator introduces azimuth angle of train. Obviously when target position and azimuth angle of train are equal a null of CT rotor voltage will occur. Plate rectifier tubes 40 and 41 in box 48 have their grids connected push-pull to the rotor through transformer 42. Balancing potentiometer 43 in the cathode circuits of tubes 40 and 41 assures equal voltage output to the phase shifters when no A.C. signal is applied to the grids of the rectifier tubes from the CT synchro 31. Thus with equal voltages applied to the phase shifters the degree of phase shift is the same in each so the phase of the signal in the left side is the same as that in the right. The AN/SQG–( ) sonar interprets this as proper zero error training on the target.

The voltage applied to the plates of the plate rectifier tubes 40 and 41 is 60 cycle A.C. from the synchro A.C. buss. It is applied to the two rectifier tube plates through equal load or plate resistors 44 and 45. Thus with no grid signals and the cathode potentiometer 43 balanced equal plate rectification takes place as mentioned before. When a signal voltage from the CT synchro, due to an off-train error, is applied to the two grids in push-pull, through transformer 42 the grid voltage in one rectifier will be in phase with the plate voltage while in the other rectifier the grid voltage will be out of phase with the plate voltage. This causes increased rectified plate current in the one and reduced rectified plate current in the other. A larger off-train angle resulting in a larger voltage on the grids increases the current still more in the first tube and further reduces it in the other.

If the off-train angle is changed in the opposite direction, the CT voltage would change 180°. This interchanges the grid voltages producing the reverse differential rectifier effect. The rectifier tube's outputs are limited either by cut-off or grid current depending on the polarity of the grid voltage.

The outputs of the differential plate rectifiers 40 and 41 are filtered by resistor 46 and capacitor 47 and resistor 46a and capacitor 47a respectively. This assures a smooth D.C. control voltage to the phase shifters.

The same technique which was used for producing a simulated phase control differential effect in accordance with the bearing off-train errors of the target, is employed for tilt angle errors. The resulting four biases which bear a proportionate relation to train and tilt errors are applied to the target phase shifters to shift the signal relative to the center of the four quadrants of the transducer.

All echoes must be presented in a proper time relationship with respect to the transmitted pulse depending upon their range. For this reason these circuits have to be timed or synchronized from the AN/SQG–( ) sonar, or other type sonar in use. This is accomplished by bringing into the simulator pulse No. 1 which is coincident with the leading edge of the transmitter pulse and initiates the range time, and pulse No. 2, which is coincident with the end of range time, initiates the recycle. These two pulses drive flip flop timing multivibrator 64A. The multivibrator wave form output furnishes opposite polarities for subsequent circuit requirements.

The wave form polarity which has the negative swing during the range time is used to drive a linear sawtooth generating circuit in box 66a. This linear sawtooth voltage is branched to as many targets as necessary. The use of a common linear sawtooth voltage source for all targets makes for alignment simplicity since a linearity calibration is made only once and is the same for all targets.

This sawtooth voltage is employed by the simulator to determine range which is referenced from each transmitted ping in terms of time delay. A circuit for obtaining a pulse at some time delayed interval as determined from positional information is illustrated in FIG. 7. A resistor 67 is excited with a D.C. voltage of negative polarity by potentiometer 68. This D.C. voltage is a linear function of range. To a second resistor 69 in series with resistor 67 is applied the positive rising sawtooth voltage. A target trigger circuit 70 is connected to the junction of the two resistors and is adjusted to fire at the time the voltages reach zero, when it generates a time delayed pulse corresponding to the time it takes the sawtooth voltage to rise to the zero value at the junction of the two resistors. The relation of the three waves are illustrated in FIG. 8. Zero voltage of course occurs at the junction of the two resistors when the positive rising sawtooth voltage exactly balances the negative D.C. The resulting pulse is coincident with range, being generated at a specified time subsequent to the transmitted pulse. As shown in FIG. 1 the range value is served to the potentiometer by the range servo in box 72. The range coincidence pulse is generated in box 74.

The range coincidence pulse is used to trigger a one-shot target control multivibrator 75 (see FIG. 11) in Z voltage generator 76, which produces a wave with a fixed predetermined duration.

In practice the duration of the target echo pulse corresponds to the length of the target in range. That is, the duration is longest when the target presents a fore to aft aspect and shortest for beam aspect. On the other hand, the intensity or amplitude of the target echo is greatest in beam and smallest for fore and aft aspect. The generation of simulated target aspect voltages and the control of the target envelope as a function of target aspect, depth echo and wake simulation are all derived from the target control multivibrator 75 and are effected in a unique combination of interdependent electronic units.

In target Z voltage generator box 76 a Z shaped wave having equal amplitudes each side of the A.C. axis is formed by employing the pulse from the target control multivibrator (wave form A in FIG. 9) to generate a sawtooth voltage (wave form B) which is recombined with the multivibrator pulse to produce the Z voltage (wave form C). This wave form is clipped in target envelope generator box 78 (wave form D) and then differentiated (wave form E) resulting in a center pulse whose mid-point of duration corresponds to the center of the original Z voltage. The negative leading and trailing pulses respectively are then clipped off leaving only the center positive one (wave form F) which is employed as the target envelope.

By suitably controlling the amplitude of the Z voltage in Z voltage generator 76 as a function of target aspect we produce a proper duration variation of this target envelope. Additionally it will be observed that the amplitude of the differentiated pulse will vary. With a large amplitude of Z voltage resulting in a short duration of the pulse we get a proportionate increase in the amplitude of the pulse. This it will be observed corresponds to a beam position of the target so we also obtain the simulation of target intensity increase with beam aspect to which this duration of shortest pulse would correspond.

Where the target presents a fore and aft aspect, the amplitude of the Z voltage input is reduced resulting in a differentiated pulse of longer duration. See FIG. 9b. The amplitude of the differentiated pulse is small which reflects the actual state of target echo intensity as compared with beam aspect.

In addition to form the target envelope, the Z voltage is employed to generate a target aspect deflection voltage which, when fed to the target phase shifters produces a differential phase shift of the target echo in the transducer quadrants to correspond with target aspect. The target aspect deflection voltage is merely the Z voltage, controlled as a function of range and aspect. The duration of the Z voltage being constantly, the amplitude and polarity are subject to control in target aspect deflection generator in box 89.

By referring to the diagram of FIG. 10, we see how this Z voltage must be controlled so as to convey the proper aspect representation. As pointed out the duration of the Z voltage or its length in range is at all times a constant, therefore we see the proper control is only one of amplitude and polarity. Position 1 which is target aspect at 0° shows the voltage at the necessary zero amplitude. As the target turns to the 45° aspect shown by position 2 the Z voltage would have to proportionately increase. Further turning of the target requires increasing the amplitude still further until an aspect angle a few degrees before 90° is reached. At this position the target is approaching a beam aspect and since returning wave fronts are coming from both the bow and stern simultaneously, interference results which destroys the aspect presentation. It therefore shows as only a blob. This representation is accomplished by switching off the Z voltage just before 90° aspect is reached. The Z voltage remains off until a corresponding position a few degrees past 90° is reached, whereupon the Z voltage is switched on but this time with the reverse polarity as will be noted from positions $a$ to $b$ position 3. The Z voltage is now reducing position 4 until it reaches zero value at an aspect of 180°, shown by position 5. After passing through 180° the Z voltage again increases but with a reversed polarity. This, it should be noted, corresponds exactly with the polarity and amplitude characteristic in turning from the 0° aspect position. Thus it will be noted that the sequence of Z voltage variation goes through two cycles for every 360° of target aspect rotation.

By selecting the corresponding and appropriate polarity of the Z voltage as a function of this target aspect we can select the positive half cycle as occurring before or after corresponding to the target's stern being before or after. By clipping and selecting the positive Z voltage polarity an envelope is obtainable. This can be used as the wake envelope and is able to properly position the wake before or after the target depending upon the target's direction of travel. It gates on the wake signal in the wake gate box 22. When the target is in the beam position the AN/SQG–( ) sonar cannot present target wake since it would be simultaneously received with the target. This fortunately occurs during the polarity switchover so the wake envelope is appropriately removed during this aspect position.

This wake envelope is of fixed duration depending upon the duration of the original Z voltage. It presents no serious problem however, for which the AN/SQG–( ) wakes would quickly run off the limited visible viewing sector and additionally, wake intensity variations with speed are far more significant. This intensity variation of the wake signal is provided for so very little loss of significant wake simulation will occur and the simplicity of the fixed relationship is very real and desirable.

The target depth echo occurs on submerged targets only during the beam interval of aspect. It actually is a multiple echo of the target produced by signals being reflected from the target's hull up to the surface and back down again. It appears at a distance in range behind the target equivalent to the depth of the target and as might be expected, of considerably less intensity than the target.

The sawtooth voltage generated in the aspect deflection wave form generator, which was used as the basis of all the preceding target motion functions is again used to generate the target depth echo envelope. Here the sawtooth voltage is employed to furnish a time delayed pulse in a coincidence circuit. The amount of time delay is a function of a D.C. voltage from a potentiometer which in turn is rotated as a function of target depth. The sawtooth voltage and the potentiometer voltage are so proportioned that zero depth position gives a pulse coincident with that of the target which would be the middle of the sawtooth voltage. Increases in depth would increasingly delay the coincidence pulse up to the limit of the sawtooth voltage. If an adequate duration is originally selected sufficient depth positioning will be available.

The coincidence of this depth voltage and the sawtooth voltage generates a pulse in a pulse forming circuit which is used as the target depth echo envelope, in target depth echo envelope box 80. Since this depth echo only occurs in the target beam position it does not have to have any variation in its duration with respect to target aspect. However, it is necessary to switch it off for all target aspect positions except the beam position. This necessary control is fortunately readily available from the target aspect deflection box 89. Because the depth echo is generated from the target Z voltage generator it moves along in range with the target, differing from it only as a function of depth.

Since all these various target motion characteristics are derived from the one range control function it will be seen that a high degree of stability in their relationship as respect to range is to be expected.

It is thus seen that the generation of target, target wake and target depth echo envelopes and target aspect deflection voltage are derived from a target multivibrator 75 which generates a wave form with a fixed predetermined duration initiated and controlled by the range coincidence pulse. The duration of this wave form is selected on the basis of a minimum target range compromised with the selected distance over which it is desired to display wake. This might be set up as an example employing round numbers. Assume a target 300 feet in length and positioned with a bow or stern aspect so that its length is fully displayed in range. Thus the duration of this multivibrator pulse must be for a minimum distance of 300 feet, which is plus and minus 150 feet either side of center. The bow or stern, whichever end is facing us, would correspond to and be very close to the initiating coincidence range pulse. The minimum position this coincidence could take would be at the beginning of the linear sawtooth voltage corresponding to a zero range. The bow or stern in this example would also be near this zero range but the center would be 150 feet away.

If we now decide to lengthen this target multivibrator wave form by an additional 400 feet or 200 feet on each end, the nearest we could bring the bow or stern of the target ship to zero range would be 200 feet. 200 feet then would represent the minimum range of the simulator.

Thus the total length of the target multivibrator wave form is 700 feet or 350 feet either side of target center. It allows us to present wake for a distance of 350 feet before or after the target as measured from the center of the target.

This one shot multivibrator wave form when triggered, holds its position for a predetermined period then drops back. Referring to FIG. 11 the adjustment of the duration of the multivibrator return swing is accomplished by an adjustment of the grid time constant by variable resistor 85. The output of multivibrator 75 is connected to the grids of two triodes 86 and 87 being coupled thereto by capacitors 88 and 89a. Tube 86 has its cathode grounded and is a sawtooth generator switch tube which produces a sawtooth voltage during the interval of the wave form when the tube 86 is switched off. Tube 87 is also cut-off by the multivibrator negative swing but has an adjustable biasing potentiometer 88a which is connected to its grid to allow the tube cathode voltage to be set during its conducting interval between negative swings. This as will be seen is the base line for the Z voltage.

Tube 90 associated with tube 87 has a common cathode connection and its grid in turn is directly coupled to the plate of the sawtooth switch tube 86. This direct connection is used to maintain D.C. levels.

The action of the circuit is as follows: The second tube 87 during the interval between pulses draws a current determined by its bias setting potentiometer 88a which sets the voltage of the common cathode junction. The third tube 90 during this interval has the low plate voltage of the switch tube on its grid and is therefore non-conducting by virtue of its positive cathode. When the pulse arrives the second tube 87 is cut off leaving the third tube 90 alone to control the cathode voltage. Since this tube now acts as a cathode follower it repeats the sawtooth voltage applied to its grid. At the end of the pulse and sawtooth the second tube 87 regains control of the cathode voltage and sets the base line. By adjusting the bias of this second tube 87 the base line can be set at the middle of the sawtooth voltage with the result that the wave form of voltage at the cathodes is the symmetrical Z voltage described.

The Z voltage is taken off through two connections. One directly from the cathode where the voltage is constant, the other from the arm of potentiometer 91 which makes up the cathode load resistor and thus supplies a varying output depending on the potentiometer position.

A capacitor 92 connects the cathode of tube 90 to the grid of tube 90a. Tube 90a is connected by capacitors 100 and 100a to potentiometer 93 which is excited by its push-pull output. Potentiometer 94 has its two end terminals connected to the arm of potentiometer 93. The potentiometers 93 and 94 have continuous rotation with a 15 to 20 degree gap at the ends of the winding representing beam aspect. They are grounded at their center taps by leads 97 and 97a. This corresponds to fore and aft aspect as previously explained. The rotating contact arms of the two potentiometers are mechanically coupled together in the same positions and are rotated as a function of target aspect at twice speed. The output of the two cascaded potentiometers supply a voltage which varies with potentiometer rotation and has in addition a proper polarity for target aspect deflection, see FIG. 12. The voltage output is used to modulate the phase shifters differentially or in push-pull so as to impart to the echo signal a corresponding phase positioning.

The wave form of FIG. 12 has a fixed duration so that $t$ which represents the time of a ½ cycle will always be a constant. The function the potentiometers must provide then will be to establish the relationship of the peak voltage $e$ with respect to the aspect angle $a$. This can be readily discerned by considering the solid line wave form of aspect angle $a$ and voltage amplitude $e$ and the dotted line wave form representing a different aspect angle $a'$ and its corresponding voltage amplitude $e'$.

Observation discloses that the tangent of the aspect angle $a$ involves the time $t$ and the voltage $e$. Thus tangent $a$ equals $e/t$ for the solid line wave form and tangent $a'$ equals $e'/t$ for the dotted line wave form. Since $t$ is constant for both cases the relationship of the voltage $e$ to the aspect angle $a$ is as the tangent of the aspect angle.

This requires that the output aspect deflection wave form vary in amplitude as the tangent of the aspect angle. Sine functions are readily obtainable in potentiometers of standard manufacture but tangent functions are not. The tangent of an angle varies from zero at 0° to infinity at 90°. This is obviously an impossible function to reproduce and therefore for practical reasons we have to stop short of 90°. Fortunately we do not have to go to 90° because this represents the beam aspect position of the target where the aspect degenerates. Thus actually we have to stop a few degrees short, approximately 5 or 10 degrees. The value of the tangent function is 5.67 for 80° and 11.43 for 85° representing reasonably achievable values.

A potentiometer wound to reproduce a tangent function up to a reasonably selected value would be quite a special item. While this could be done it was deemed a far more desirable situation if it could be accomplished with more standard potentiometers. A sufficiently accurate method fortunately exists, using cascaded linear potentiometers.

The two linear potentiometers 93 and 94 are arranged to have continuous rotation and the gap between opposite ends of the windings is about 15 to 20 degrees. When the contact arms passes over these gaps the circuit is obviously opened and this position represents beam aspect, all deflection voltages being removed. Opposite the gap or at the midpoint of the winding, a tap is placed and this is made a grounded connection. When the contact arms are in this position all voltages are grounded out. This position corresponds to the bow or stern aspect.

As the potentiometer arms are rotated away from the grounded center taps the voltage at the output arm increases at a geometric rate even though the potentiometers are linear types. Also since the second potentiometer produces a loading on the first potentiometer it makes it possible to alter the form of the resulting curve. To a fair approximation this can be adjusted to fit a tangent curve. See FIG. 13.

Because highest accuracy is desired in the vicinity of 45° the curve can be made coincident with the tangent curve in this region, allowing it to run out as the extreme positions are approached. When adjusting for a correct or optimum ratio it is not necessary to employ potentiometers of different values. Both potentiometers can be of the same value for standardizing purposes and a fixed resistor 98 shunted across the second potentiometer. This fixed resistor accomplishes the desired loading and alters the curve shape.

Errors can be minimized in the 45° vicinity so that aspect errors will be less than 1° and increasing either way out to values in the neighborhood of 5 or 10% towards the ends.

The first potentiometer is excited push-pull so that when the arm crosses the gap the reverse polarity is available. This gives the correct aspect voltage orientation when the ship passes through beam aspect. Refer to FIG. 10. The opening of the circuit during the gap interval removes the aspect voltage and this nicely corresponds to the actual desired beam situation. On either side of the gap the voltage will be a maximum which gradually decreases as the center tap is approached. At the center tap the voltage is zero corresponding to the bow or stern aspect and just on either side starts to rise but with opposite polarity. This again corresponds to the desired characteristic as shown on FIG. 10.

It might be pointed out that if the duration of the target echo pulse varies it will not affect the aspect. The only result will be the brightening of the aspect line for a greater or less extent symmetrically about the center position.

The output of potentiometer 94 is connected to potentiometer 95 which is driven as a function of range from range servo box 72. It reduces the aspect deflection voltage with range to correspond with the reduction of the deflection ability as range increases. The arm of potentiometer 95 is connected to the grid of phase inverter 96 which converts the aspect deflection voltage to a push-pull voltage for proper drive of the left and right phase shifter circuits. The resulting phase modulation by means of the target aspect deflection voltage, has been controlled in terms of polarity and amplitude as a function of target aspect and range.

In the target aspect deflection generator in box 89, two cam-operated switches 103 and 104 are driven by target aspect servo motor in box 106 which also drives aspect potentiometers 93 and 94 and potentiometer 91 in the Z voltage generator box 76. Switch 103 connects the grid of wake gate envelope tube 108 in box 22 to the ends of the winding of potentiometer 93. The cam is arranged to switch the polarity of the Z voltage fed to the wake gate envelope tube 108, when the arm of the potentiometer passes over the gap at the ends of the winding.

Thus with one polarity the positive side of the Z voltage will be the first half cycle while with the reverse polarity the second half cycle will be the positive side. The wake gate envelope tube is biased to pass only the positive half cycle and thus its output contains a positive pulse only. For the first position this pulse precedes the target and for the second position the pulse follows the target. This pulse thus can be used as the wake envelope and presents the wake in its fore or aft position as the target swings through beam aspect.

The simulation of target wake is effected with some limitations. Two limitations are position and length. The wake can be positioned only straight back along the line of the target and to a limited distance. This is because the aspect deflection wave form voltage, which due to its straight line characteristic for target aspect, can position signals just preceding or following the target only on the same straight line. The fact that it has limited duration, limits correspondingly the length of the wake signal. This limitation may not be serious since most target wakes unless in a bow or stern aspect soon would run off the limited sector width. The fact that target wake may be placed before or after the target in range by this proposed method is of considerable interest.

Cam switch 104 switches on the target depth echo envelope in target depth echo envelope box 80 when the target is in beam aspect. It switches off the depth echo envelope for all other aspect positions.

The linear sawtooth voltage taken from the plate of the sawtooth switch tube 86 in the target Z voltage generator is placed on the grid of depth echo pulse tube 112. This tube has a variable position cathode bias obtained by a bleeder from B+. The cathode voltage of tube 112 is controlled by target depth potentiometer 113 to which the tube cathode is connected. Depth echo pulse is a delayed pulse subsequent to the target echo. Time delay is determined when the sawtooth voltage has sufficient amplitude to cause the tube to conduct with the given cathode bias setting as determined by the depth echo potentiometer 113. The amount of time delay is a function of the D.C. voltage from the potentiometer 113 which is driven as a function of target depth. As previously mentioned the sawtooth voltage and the potentiometer voltage are so proportioned that zero depth position gives a pulse coincident with that of the target. Increases in depth would increasingly delay the coincidence pulse up to the limit of the sawtooth voltage.

A pulse transformer 114 is provided in the plate circuit of tube 112 to shape the initial plate current flow into a pulse. Transformer output is connected to a cathode follower comprising tube 116 the grid of which is connected to the secondary of the transformer, the other end of which is grounded. Resistors 126 and 128 connected in series from B+ to ground in lead 129 form a positive bias for the cathode of cathode follower 116. The cathode follower thus is biased to clip off transient negative swings from the pulse. The cathode of tube 116 is connected to cam driven switch 104 through resistor 124. Thus switch 104 when in its closed position places a high positive bias on the cathode of tube 116 keeping it cut off. In this manner switch 104 turns the depth echo pulse on or off. The output of tube 116 is fed to the target envelopes gate in box 19 so that the target depth echo pulse may be gated on and off with the target envelope in the four transducer channels. The target gate in box 18 being connected to the output of the gate in box 19, the target signal is gated to the channels in accordance with the depth echo pulse as well as the envelope pulse and transducer train and tilt error.

It is accordingly seen how the target control multivibrator furnishes the target depth echo and target wake pulses in proper time relation to the target pulse and how the aspect deflection voltage is derived from the output of the multivibrator.

Returning to the Z voltage generator the output voltage taken from the arm of potentiometer 91 is used to form the target envelope. The center tap of the potentiometer winding is tied to the common cathode of tubes 87 and 90 and its arm is servoed as a function of target aspect. This Z voltage is fed to the grid of a two tube zero grid current symmetrical limiter consisting of tubes 130 and 136. The bias on the grid of tube 130 is adjusted by potentiometer 132 while potentiometer 134, adjusts the grid of limiter tube 136, thus allowing separate adjustment of the positive and negative clipping level. These clipping levels are set for symmetrical clipping of the Z voltage and are not varied subsequently during operation. The input voltage to this clipper is varied in amplitude by the aspect potentiometer 91 as a function of aspect. When the voltage is large the clipping is deep and the wave form more square while with a low voltage the clipping is slight and the center transition slope more gradual. See FIG. 9b.

The output of limiter tube 136 is fed to a two stage RC differentiating circuit 140 comprising series capacitor 142 and grounded resistor 144 in the first stage and series capacitor 148 and shunt resistor 146 in the second stage. The second filter section while of the same time constant as the first has a considerably higher impedance to give sharper cut-off and less amplitude loss. The shunt resistor 147 across the second differentiating capacitor 148 is to adjust the phase of the frequency components of the resulting pulse for better symmetry.

Differentiating the clipped wave form which has three vertical transitions the beginning down, the center slope up, and the end down, results in three pulses, the first down, the second up, and the third down. Their durations correspond to the duration of their vertical transitions. See FIG. 9a which shows the sequence of these wave forms and the effect amplitude variations has on the slope and duration of the center transition.

As a result of these relationships varying the amplitude of the input voltage to the clipper effects a corresponding variation in the duration of the center pulse. Also since the Z wave slope is essentially made up of straight lines the duration of the resulting pulse will be inversely proportioned to the clipper input voltage amplitude.

The differentiated clipped wave has another inherent characteristic in that the amplitude of the resulting pulse is a function of the slope of the voltage transition. This gives to the center pulse a varying amplitude depending upon steepness of transition slope. The steep slope thus has a short duration and produces a high amplitude pulse while the lesser slope has a long duration and a correspondingly low amplitude pulse. This matches actual conditions of echo amplitude or intensity in which target beam position gives a high intensity but a short duration of echo and a bow or stern aspect a lower intensity but a greater duration of echo.

A dual triode tube 152 and 154 receives the output of the RC differentiating circuit on the grid of tube 152. Tube 154 is associated with tube 152 by means of a common cathode connection 155. Tube 154 has its grid biased to effect negative clipping. The dual triode tube is used to clip off the negative leading and trailing pulses of the differentiated wave form leaving the positive one which is employed as the target envelope. Wave form F FIG. 9a. The target envelope pulse is fed to the target envelopes gate in box 19 which is connected to the target gate in box 18 to gate on the target signal in the proper time relationship from the plate of triode tube 154 in the target envelope generator box 78.

The outstanding feature of all of this circuitry is that only one source controls the entire associated functions of the target, such as aspect, wake, depth echo, and intensity variations. The functions derive naturally from the circuits and no oscillator or multivibrators are used which might affect individual accuracies or give rise to irregularities. Also since the functions relate to one source only, differential inaccuracies are non-existent.

The circuitry for the phase shifters shown in block 52 and block 150 of FIG. 1 and FIG. 1a respectively, is deemed a unique improvement over devices presently in use. As was previously explained the relative phases of the target and wake signals in the four transducer channels are responsive to transducer train and tilt angle errors and target aspect. A D.C. bias voltage controls the phase as a function of off-train errors and upon this bias is superimposed the A.C. deflection wave form which describes target and wake aspect.

As shown in FIG. 4 the two outputs of rectifier tubes 40 and 41 represent differentially the transducer train angle error as left and right. The same is true for tilt angle errors which represent top and bottom. However since the four quadrants have positions which are intermediate between right and left and top and bottom the developed error voltages have to be combined so as to be proper and equivalent for the four transducer channels. An arrangement for doing this is shown in FIG. 2. There is provided a diamond-shape arrangement of eight equal resistors with two to a side. Resistors 160 and 161 are connected to the bottom left transducer channel; resistors 162 and 163 are connected to the bottom right transducer channel; resistors 164 and 165 are connected to the top right transducer channel and resistors 166 and 167 to the top left transducer channel. The intermediate D.C. biases from the junctions of the two resistors on a side are fed to the appropriate transducer channels. The left and right points of the diamond are fed with the left and right error bias voltages as derived from tubes 40 and 41 and the top and bottom points are fed with the top and bottom error bias voltages from tilt error rectifier tubes (not shown). Connected to the left hand transducer inputs in advance of the phase shifters are capacitors 170 and 171. To the right hand transducer inputs are connected capacitors 173 and 174. Through capacitors 170 and 171 the left A.C. aspect deflection voltage from phase inverter tube 96 shown in FIG. 11 is introduced while the right aspect deflection voltage is introduced through capacitors 173 and 174. The capacitor connections in no way disturb the biases since the capacitors cannot pass D.C. and therefore produce loading. At the same time the resistors have sufficient impedance so that the A.C. source is not excessively loaded. The circuit is actually similar to a resistance capacitor coupling as commonly employed in audio amplifiers. This A.C. aspect deflection voltage has to be supplied push-pull from a phase inverter tube as previously pointed out. Push-pull is required since the phase must be retarded in one half while it is advanced in the other.

The phase shifter circuits are especially designed to give plus and minus 90° phase shift which correspond to the full grid swing of the phase shifter tubes, from cut-off to zero bias. It is important that the grid swing of the phase shifter tubes should be limited so that the phase shifting does not exceed the plus and minus 90° as otherwise the AN/SQG–( ) will begin to repeat the target display. A bias limit must also be present to prevent grid current in the phase shifter tubes which would affect the position bias and introduce errors. Accordingly deflection limiters in block 175 are provided to prevent the phase shifter grids from being overswung.

The limiter circuit consists of a diode in series with the grid of a cathode follower in each transducer channel. For example, triode 176 and cathode follower 177 are so connected in the top left channel; triode 178 and cathode follower 179 are so connected in the top right channel; triode 180 and cathode follower 181 are likewise connected in the bottom right channel and triode 182 and cathode follower 183 are connected as such in the bottom left channel. The triodes 176, 178, 180, 182, have their plates connected to the cathode follower grids in the above arrangement with grid leak resistors 184, 185, 186 and 187, respectively in each combination tying the cathode follower grids to ground reference.

The action of the limiter circuits can be explained in the following manner. Consider first a signal excursion in the positive direction. This naturally carries the cathode of the diode with it and since the plate of the diode is at ground the diode ceases to conduct when the cathode reaches this potential. This opens the diode circuit and more positive signal swings cannot be passed on to the cathode follower grid. Thus the positive signal swing limit obtainable from the cathode follower is set. If signal swings in the negative direction are now considered we see that the diode will still continue to conduct carrying the diode plate and cathode follower grid along with it. Eventually the cathode follower will be cut off by its grid becoming sufficiently negative. This therefore sets the negative clipping level limit.

The voltage limit level out of the cathode follower will therefore be zero volts for the negative swings and a positive limit on positive swings determined by the positive cathode voltage obtaining at zero grid voltage. This positive voltage at the cathode will be the positive limit. It should be noted that this can be adjusted independently of the input signal by the choice of cathode follower plate voltage and/or cathode resistor value. It will also be noted that the D.C. bias voltages have been offset and this it will be seen, is necessary for fitting properly the phase shifter grid swing characteristic.

The phase shifter circuitry itself is interesting and is rather unique in that it develops a very large linear phase swing and only a limited amount of amplitude variation. To significantly vary the output voltage with phase modulation would seriously impair the value of the phase shifter.

As shown in FIG. 2 a dual triode tube is provided for each channel comprising triode phase inverters 190, 191, 192 and 193 and triode phase shifters 195, 196, 197 and 198. The phase inverters have equal load resistors in the plate and cathode. The phase shifter tube has its cathode connected through a quadrature capacitor 200, 201, 202 and 203 to the plate of the phase inverter. A high value resistor 214, 216, 218, 220 from B+ to the plate of the phase shifting tube is provided for polarizing purposes. Phase shifting control voltage is fed from the deflection limiter cathode in series with the secondary of transformers 204, 205, 206, 207 to the grid of the phase shifter tubes. Target and wake signals are fed to the grids of the phase inverter tubes, 190, 191, 192 and 193 through capacitor and resistance couplings 222, 224, 226 and 228, respectively, and also to the primary of transformers 204, 205, 206 and 207. The plate resistance of the phase shifters is controlled by the phase shifting modulating voltages placed on their grids from the deflection limiters in series with the transformer secondaries. The value of the phase shifter plate resistance is of course limited by cut-off bias of the tube for the negative swing and zero grid bias of the tube which is the maximum achieved voltage on the positive swing. Phase shifting circuits following this general form are capable of a maximum phase swing of 180° or plus or minus 90° providing the variable resistance can vary from zero to infinity. Since this is not possible with the phase shifter tube less than this phase swing normally obtains. In order to have the phase shifter tube act as a pure variable resistance its grid must be fed the same signal, equal in phase and amplitude, as its cathode. The use of the transformer enables this to be done without interfering with the action of the modulating voltage especially the higher modulating frequencies. By differentially adjusting the phase of the signal on the grid of the phase shifter tube with respect to its cathode a much larger phase swing is accomplished. Actually a total phase shift of over 200° is possible. Phase shifting of this magnitude is accompanied by noticeable amplitude modulation. When the device is adjusted for plus and minus 90° of phase modulation, however, an amplitude modulation of about 30% will normally follow. This variation is symmetrical with minimum amplitude at the center phase position and increasing evenly with phase rotation either way.

The plate circuit of each phase shifter is capacity coupled to an isolating cathode follower, the cathode followers being numbered respectively in the four channels from left to right 230, 231, 232 and 233. This enhances stability of performance in the phase shifters and reduces the effect of the output loading on their operation. The coupling capacitors are purposely kept small so that low frequency modulating components would be discriminated against.

As explained the output of the noise modulator 16 is divided two ways. One branch feeds the individual target gate 18 and the other the reverberation modulator 20. This second modulator modulates the signal with a very low band of random noise frequencies, selected by the very low pass filter 23 from the same original random noise source tube. This gives to this branch of the signal an envelope characteristic representative of reverberations.

Output from the modulator 20 is further subdivided. One branch feeds individual wake gate 22. Another branch, appropriately attenuated with time and position effects, furnishes reverberation signals. A manual attenuator for these reverberation signals allows settings to simulate various sea state conditions.

For adaptation to the AN/SQG-( ) which has a directional transducer, the reverberation intensity is further varied as a function of angle of train. A gain control as a function of angle of train can be used to increase this reverberation signal when the azimuth angle of train is directly aft. The angle over which this increase takes place would correspond to own ship's wake and the resultant signal while still the reverberation signal would appear as own ship's wake since reverberations and wake have similar form. An additional gain control as a function of tilt angle, appropriately connected into the circuitry, would reduce these signal intensities as the depression angle is increased. This would be the equivalent of training under both own ship's wake and surface reverberations. These controls for reverberation signals are effected in reverberation control box 50 in the block diagram.

In this relatively simple manner we can dispose of the problem of reverberation, sea state or surface reverberation, and own ship's wake. The simulation also would be quite representative from the operational viewpoint and most importantly the signal itself would possess characteristics which closely match actual signals.

Reverberations arrive from all directions equally except as previously noted for surface reverberations. Here an intensity change as a function of tilt angle provides the appropriate directional information. However, the appearance of the reverberations on the scopes, due to the fact that reverberations return from random scatters, randomly located either side of the direction of scan. This means the phase of the reverberation signals in each transducer is not identical but different depending upon the location of the scatters. Two phase shifters in box 52 are fed in push-pull with a random noise voltage, obtained by selecting a suitable frequency band from the random noise generator in box 14. This differentially shifts the phase of the reverberation signal on a random basis, resulting in a lateral spreading of the reverberation signal on the azimuth scope of the AN/SQG-( ). No means of giving a corresponding spread in the vertical direction as displayed on the depth scope is illustrated. However, by repeating the same process and differentially phase modulating the two vertical halves of the transducer inputs a spread of the reverberations on the depth scope will be obtained.

The output of the cathode followers in block 150 and the reverberation echoes from block 52 are then fed to range attenuation amplifiers in box 210 where relative intensities of all the signals are simultaneously controlled and thus their relative amplitudes preserved. A single range attenuator avoids calibrating range attenuation characteristics between different signals for similarity of tracking. The range attenuator is controlled as a function of dynamic range. Target pulses are correlated through the range attenuator with the transmitter on and off control in the operational gear.

Signals representing external noises and sounds such as from own ship's propeller may be generated by suitable circuitry in block 212. Propeller noise must be gated to pass to the channels when the transducer is pointed aft and therefore a position gate is provided which is driven as a function of tilt and bearing angles. Since the distance of the noise sound is constant no provision is made for range attenuation. The output of block 212 is introduced to the channels after the range attenuator 210.

In order to adjust the signal outputs of the simulator an output attenuator 214a is provided. This enables a suitable signal level to be provided to the AN/SQG–() sonar transducer input circuits.

What is claimed is:

1. In a sonar simulator for a sonic device a signal frequency oscillator, means for modifying the frequency of said oscillator to simulate the effect of doppler of own ship and target comprising a reactance doppler modulator connected to said oscillator and adapted to shift the frequency of the oscillator, high impedance voltage source supplying to said reactance doppler modulator a voltage proportionate to a simulated own ship's speed, means for modifying said voltage as a function of a simulated transducer train angle, low impedance means for supplying to said reactance doppler modulator a voltage proportionate to a simulated relative target speed, a target envelope clamp circuit connected between said low impedance means and said reactance doppler modulator, said clamp circuit being operated by a target envelope voltage whereby the simulated relative target speed voltage is applied to the reactance doppler modulator for the duration of the target envelope voltage.

2. In a sonar simulator for a sonic device as claimed in claim 1 wherein there is provided a target envelope gate connected to the clamp circuit, the target envelope voltage being passed through the target envelope gate to the clamp circuit, said gate being operated as a function of the simulated training direction of the sonic device.

3. In a sonar simulator a target control simulator system comprising a multivibrator adapted to be triggered by a range coincidence pulse to generate a negative pulse of substantially long duration, a sawtooth wave switch tube connected to the output of said multivibrator for generating a sawtooth voltage for the duration of the negative multivibrator voltage output, a Z voltage generator connected to said multivibrator and said sawtooth generator and adapted to receive the negative voltage output of the multivibrator and the said sawtooth voltage of the sawtooth generator whereby the two voltages are combined to produce a Z voltage output and bias means applied to said Z voltage generator to adjust the symmetry of the Z voltage output.

4. A target aspect wave form generator comprising a phase inverter, means for supplying a Z voltage to said phase inverter, a pair of linear, cascaded potentiometers connected to the output of said phase inverter, said potentiometers having the centerpoint of the windings grounded, the first potentiometer having its terminals connected to the push-pull output of said phase inverter, the second potentiometer having its terminals connected together and to the arm of said first potentiometer, and a resistor connected to the arm of said first potentiometer and ground, the arms of said first and second potentiometers being mechanically coupled together in corresponding positions and driven as a function of simulated target aspect, a variable potentiometer having one terminal connected to ground and the other terminal connected to the arm of said second potentiometer, the arm of said variable potentiometer being driven as a function of simulated target range and furnishing the simulated target aspect output voltage.

5. In a sonar simulator a target envelope generator comprising a potentiometer, said potentiometer being driven as a function of simulated target aspect, means for producing a Z voltage connected to the input of said potentiometer, a limiter circuit connected to the output of said potentiometer and provided with means for producing positive and negative clipping of the aspect controlled Z voltage, differentiating means connected to the output of said limiter and adapted to differentiate the clipped output wave form producing three differentiated pulses, the center pulse having an opposite polarity to that of the other two pulses and a clipping means connected to the output of said differentiating circuits and adapted to select the center pulse.

6. In a sonar simulator a target depth echo generating system, including a Z voltage generator having a sawtooth generator, a delayed coincidence circuit having its input connected to said sawtooth voltage generator, a potentiometer driven as a function of simulated target depth and arranged to vary the bias on the delayed coincidence circuit such that the coincidence will be caused to occur from the center of the sawtooth voltage to the extreme end thereof, a switch adapted to be driven as a function of simulated target aspect and connected to said coincidence circuit, the switch connection having means for opening the coincidence pulse output when the simulated target aspect is near beam position and blocking said output when the simulated target aspect is in any other position, whereby the coincidence pulse output is caused to appear only in the vicinity of the simulated target beam aspect.

7. In a sonar simulator a target characteristic control system comprising a multivibrator triggered by a target range coincidence pulse, a sawtooth generator controlled by said multivibrator, a target depth echo system connected to said sawtooth generator and adapted to develop a target depth echo pulse as a function of simulated target depth and simulated target aspect, a means of combining said multivibrator and sawtooth generator outputs to form a Z voltage, a target aspect generator connected to said Z voltage producing means, a target wake envelope generator also connected to said Z voltage producing means, said target aspect control voltage and wake envelope generators being adapted respectively to develop a target aspect control voltage as a function of simulated target aspect and simulated target range and a target wake envelope voltage as a function of simulated target aspect, means for varying said Z voltage in accordance with said simulated target aspect, a target envelope generator system connected to the last mentioned means and adapted to produce a target envelope pulse varying in duration as a function of simulated target aspect.

8. A sonar simulator comprising a signal source oscillator, a random noise generator, a noise modulator connected to the output of said oscillator and said random noise generator, a target gate connected to said modulator, a target phase shifting circuit connected to said target gate, a limiter circuit connected to said phase shifting circuit, a wake gate connected to said phase shifting circuit, a target envelopes gate connected to said target gate, a target characteristics control system including a target depth echo envelope generator, a target envelope generator, a target wake envelope generator, and a target aspect deflection generator, said target aspect deflection generator being connected to said limiter circuit, said target depth echo envelope generator and said target envelope generator being connected to said target envelopes gate, a target doppler clamp connected to said target envelopes gate, a reactance doppler modulator connected to said target doppler clamp and to said oscillator, high impedance means for supplying a voltage to said reactance modulator proportionate to simulated own ship's speed, low impedance means for supplying a voltage to said target doppler clamp proportionate to simulated relative target speed, means for introducing a voltage proportionate to simulated target depth to said target depth echo envelope generator, means for introducing a voltage which is a function of simulated target position training to said wake gate and said target envelopes gate, and said target envelopes gate, and training error voltages to said limiter circuit, means for introducing a voltage which is a function of simulated target aspect and target range to the limitor circuit and means for controlling the noise modulator as a function of ping length.

9. In a sonar simulator, an echo signal characteristic simulator comprising a target signal circuit, a reverberation signal circuit, said simulator having a single, frequency source shared by each of said circuits whereby the same frequency is necessarily impressed on the two circuits, a random noise source and a noise modulator disposed in said circuits, the input of said noise modulator being connected to said single, frequency source and to said random noise source.

10. In a sonar simulator, an echo signal characteristic simulator as claimed in claim 9 wherein the single, frequency source is an oscillator and a doppler modulator is in frequency control of said oscillator whereby the said modulator can be adapted to apply the same doppler characteristics to the two noise modulated circuits.

References Cited in the file of this patent

UNITED STATES PATENTS

| | | |
|---|---|---|
| 2,426,225 | Krause | Aug. 26, 1947 |
| 2,466,044 | Schoenfeld | Apr. 5, 1949 |
| 2,524,847 | Springer | Oct. 10, 1950 |
| 2,563,954 | Palmer | Aug. 14, 1951 |
| 2,689,952 | Johnson et al. | Sept. 21, 1954 |
| 2,713,729 | Springer | July 26, 1955 |
| 2,731,595 | Gamertsfelder | Jan. 17, 1956 |
| 2,751,689 | Jones et al. | June 26, 1956 |
| 2,854,764 | Pierce et al. | Oct. 7, 1958 |